(12) United States Patent
Nishio

(10) Patent No.: US 6,967,303 B2
(45) Date of Patent: Nov. 22, 2005

(54) ELECTRICAL DISCHARGE MACHINE

(75) Inventor: Masaaki Nishio, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/472,501

(22) PCT Filed: Jan. 9, 2002

(86) PCT No.: PCT/JP02/00044

§ 371 (c)(1),
(2), (4) Date: Sep. 22, 2003

(87) PCT Pub. No.: WO03/031106

PCT Pub. Date: Apr. 17, 2003

(65) Prior Publication Data

US 2004/0099640 A1    May 27, 2004

(30) Foreign Application Priority Data

Sep. 26, 2001    (JP) .............................. 2001-295091

(51) Int. Cl.[7] .............................. B23H 1/00; B23H 7/18

(52) U.S. Cl. .................................................. 219/69.16

(58) Field of Search .......................... 219/69.14, 69.16, 219/69.13

(56) References Cited

U.S. PATENT DOCUMENTS

| 4,730,094 A | * | 3/1988 | Aramaki et al. | ......... 219/69.14 |
| 5,150,102 A | * | 9/1992 | Takashima | ................ 340/584 |
| 5,175,408 A | * | 12/1992 | Takashima | ............... 219/69.14 |

FOREIGN PATENT DOCUMENTS

| JP | 58-114838 A | * | 7/1983 | |
| JP | 59-152025 A | * | 8/1984 | .............. 219/69.14 |
| JP | 2-116427 A | * | 5/1990 | |
| JP | 5-2414 A | * | 1/1993 | |
| JP | 7-51946 A | * | 2/1995 | |
| JP | 9-57541 A | * | 3/1997 | |
| JP | 2001-353625 A | * | 12/2001 | |

* cited by examiner

Primary Examiner—Geoffrey S. Evans
(74) Attorney, Agent, or Firm—Sughrue Mion, PLLC

(57) ABSTRACT

There is provided a controller(11) structured in such a manner that a signal of ON/OFF of electric power of the temperature control unit (7) is received by the signal receiving section (12), according to ON/OFF of the received signal of the signal receiving section (12), the correction calculating section (13) calculates an amount of correction, this amount of correction is sent to the amplifier output command section (14), and the amplifier output command section (14) sends an axial feed operation command of the amount of correction to the drive unit(15). Correction of the thermal displacement of the machine body generated by a change in the temperature of the machining solution can be easily, effectively conducted without using a specific device, and the machining accuracy can be enhanced.

4 Claims, 5 Drawing Sheets

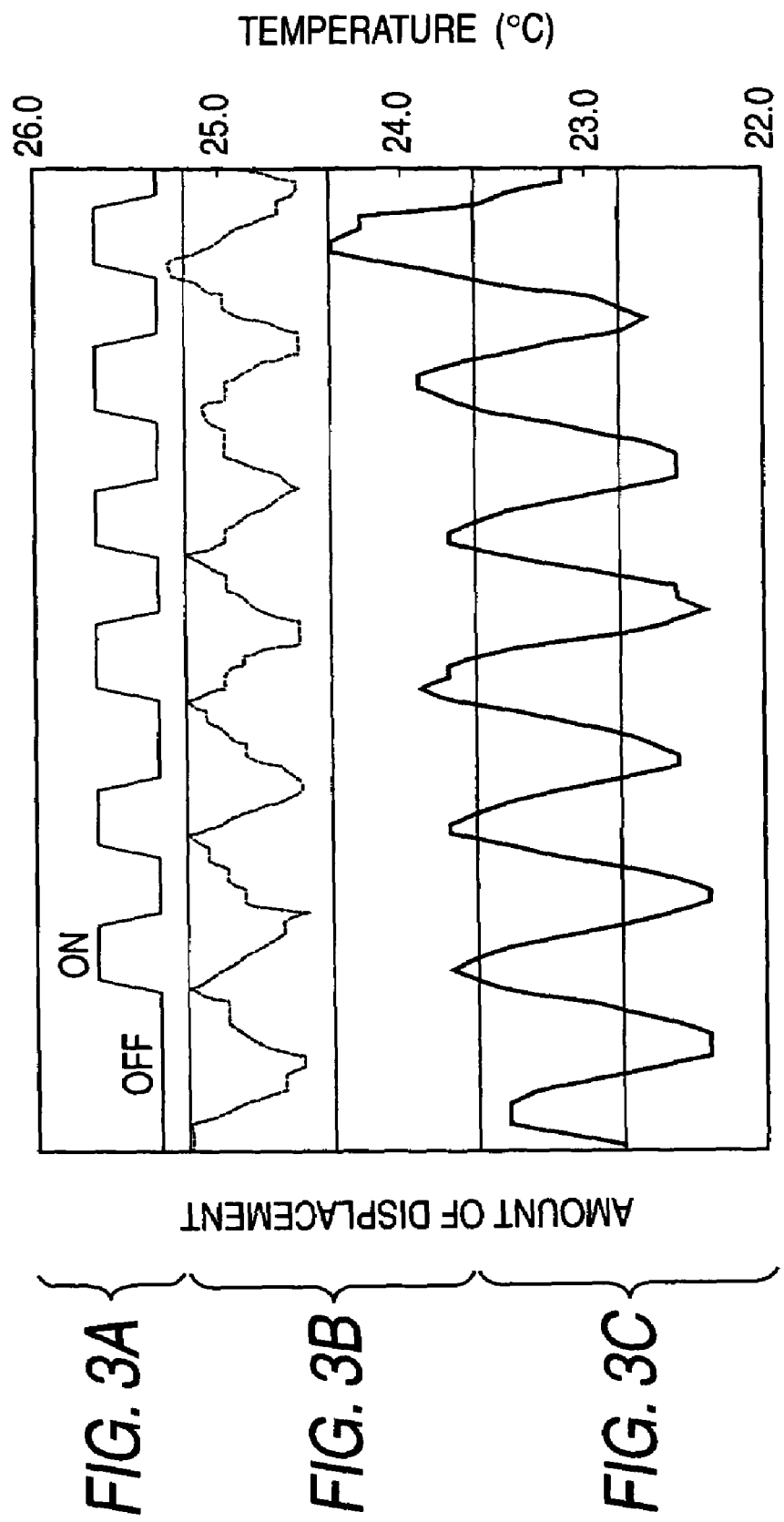

ELECTRICAL DISCHARGE MACHINE

TECHNICAL FIELD

The present invention relates to improvements in an electric discharge machine to conduct machining on a workpiece by electric discharge energy generated when electric power for machining is supplied between an electrode and the workpiece while the electrode and the workpiece are being moved relatively with each other in a machining solution.

BACKGROUND ART

In an electric discharge machine, when machining is conducted on a workpiece by an electrode in a machining solution filled in a machining tank, a temperature of the machining solution is changed by a change in the peripheral temperature and a rise in the temperature of the electric discharge machine body in the process of electric discharge machining. As a result, a relative position between the electrode and the workpiece is changed, and the machining accuracy is lowered. In order to solve the above problems, it is common to use a temperature control unit for conducting ON/OFF control of electric power so that the temperature of the machining solution can be controlled to a value close to a predetermined reference temperature (target temperature).

However, the above temperature control unit is controlled in such a manner that when the temperature of the machining solution is increased higher than the target temperature, electric power is turned on and the blowing of air is started so as to lower the temperature of the machining solution and when the temperature of the machining solution is decreased lower than the target temperature, electric power is turned off and the blowing of air is stopped so as to raise the temperature of the machining solution. Accordingly, the temperature of the machining solution fluctuates round the target temperature. Therefore, the smaller the capacity of the temperature control unit, the larger the thermal displacement of the electric discharge machine body due to a change in the temperature of the machining solution. As a result, the machining accuracy is deteriorated. Even when the capacity of the temperature control unit is increased, the temperature of the machining solution is changed. Therefore, the thermal displacement is caused in the electric discharge machine body, and the cost is increased.

Recently, there has been an increasing requirement of enhancing the machining accuracy of electric discharge machining. In order to meet the requirement, it is necessary to suppress the deterioration of the machining accuracy caused by a change in the temperature of the machining solution.

DISCLOSURE OF THE INVENTION

The present invention has been achieved to solve the above problems. It is an object of the present invention to provide an electric discharge machine capable of enhancing the machining accuracy when an axial displacement caused by a thermal displacement of the electric discharge machine body, which is caused by a change in the temperature of a machining solution, can be effectively corrected.

The present invention provides an electric discharge machine having a temperature control unit for controlling a temperature of a machining solution in a machining tank by turning on and off electric power, machining electric power being supplied between an electrode and a workpiece while the electrode and the workpiece are being relatively moved in the machining solution by a drive means, the workpiece being machined by electric discharge energy, the electric discharge machine comprising: a control means for operating the drive means in a direction in which a thermal displacement of the electric discharge machine body, which is generated by a change in the temperature of the machining solution when electric power of the temperature control unit is turned on and off, is canceled.

The present invention also provides an electric discharge machine having a temperature control unit for controlling a temperature of a machining solution in a machining tank by turning on and off electric power, machining electric power being supplied between an electrode and a workpiece while the electrode and the workpiece are being relatively moved in the machining solution by a drive means, the workpiece being machined by electric discharge energy, the electric discharge machine comprising: a control means for calculating an amount of correction in a direction in which a thermal displacement of the electric discharge machine body can be canceled corresponding to a signal of ON/OFF of electric power of the temperature control unit, wherein an operation command of feeding an axis corresponding to the amount of correction is sent to the drive means.

Since the electric discharge machine of the present invention is structured as explained above, it is possible to effectively correct an axial displacement caused by a thermal displacement of an electric discharge machine body generated by a change in the temperature of a machining solution. Therefore, it is possible to provide an effect of enhancing the machining accuracy.

BRIEF DESCRIPTION OF THE DRAWINGS

FIGS. 3A to 3C are graphs showing a result of the measurement of the axial displacement caused by operation of ON/OFF of electric power of the temperature control unit 7 when the electric discharge machine is operated.

BEST MODE FOR CARRYING OUT THE INVENTION

Figure 1A:
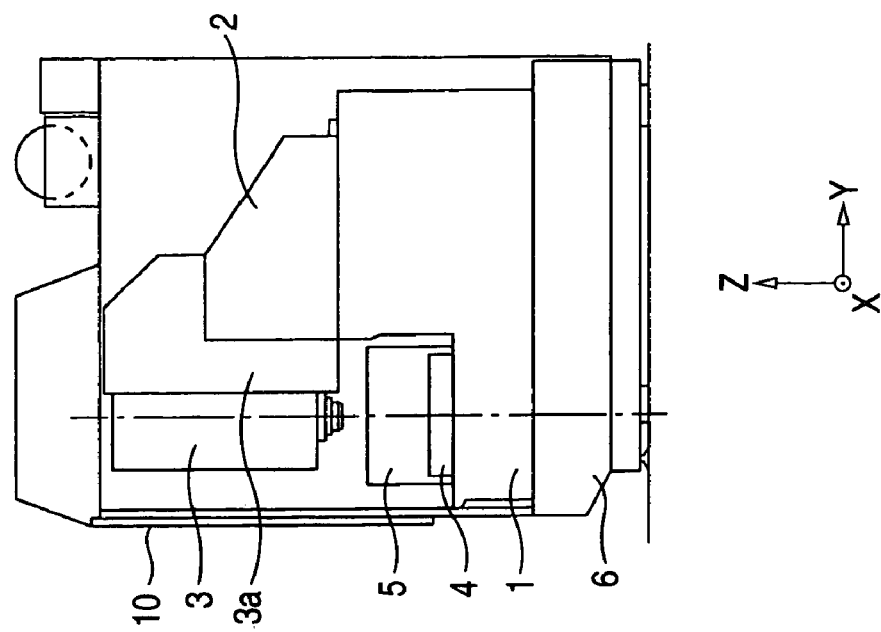
FIGS. 1A and 1B are arrangement views showing an example of the diesinking machine which is an example of the electric discharge machine.
Figure 1B:
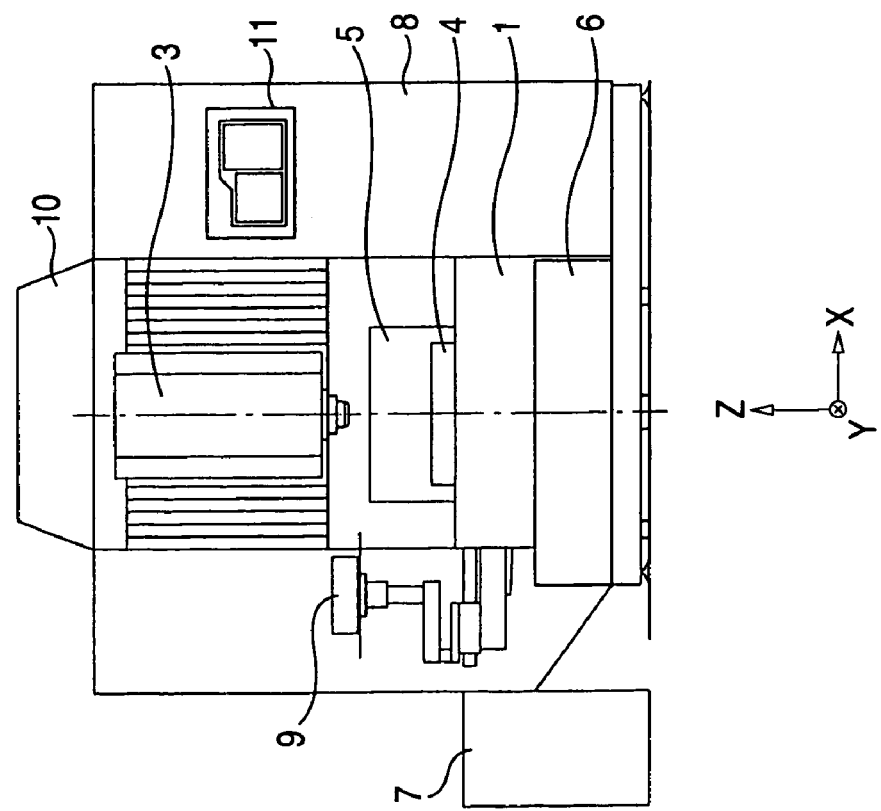

Referring to the drawings, a diesinking machine, which is an example of the electric discharge machine of the present invention, will be explained as follows. FIGS. 1A and 1B are arrangement views showing an example of the diesinking machine. In the figures, reference numeral 1 is a bed, reference numeral 2 is a ram, reference numeral 3 is a head, reference numeral 3a is a head base, reference numeral 4 is a surface plate, reference numeral 5 is a machining tank, reference numeral 6 is a machining solution tank, reference numeral 7 is a temperature control unit, reference numeral 8 is an electric power source for machining, reference numeral 9 is an automatic tool exchanger, reference numeral 10 is a cabin, and reference numeral 11 is a control means.

The diesinking machine shown in FIGS. 1A and 1B is includes primary components including the bed 1, ram 2, head 3 and head base 3a and covered with the cabin 10. The ram 2 is arranged so that it can be positioned in the direction of Y axis by a guide not shown arranged on the upper face of the bed 1. The head base 3a is arranged so that it can be positioned in the direction of X axis by a guide not shown arranged in the ram 2. The head 3 is arranged so that it can be positioned in the direction of Z axis by a guide not shown arranged in the head base 3a.

An electrode not shown is attached to an end portion of the head 3. A workpiece not shown is set and fixed on the surface plate 4 in the machining tank 5. A machining solution not shown is supplied from the machining solution tank 6 to the machining tank 5 by a pump not shown in the drawing. The machining solution circulates between the machining tank 5 and the machining solution tank 6. In order to suppress a change in the temperature of the machining solution caused by the heat generated in the process of electric discharge machining, ON/OFF control of electric power is conducted by the temperature control unit 7 so that the temperature can be close to a target value.

Axial feed in the directions of X, Y and Z axes is conducted by a respective drive means such as a linear motor not shown. Control of positioning of each axis is conducted by a command given from the control means 11 arranged adjacent to the machine body. According to the control of positioning, a relative position between the electrode attached to the head 3 and the workpiece fixed to the surface plate 4 can be determined.

The workpiece is machined by electric discharge machining as follows. While positioning control of the drive means is being conducted by the control means 11, electric current pulse energy is supplied from the electric power source 8 to between the electrode and the workpiece in the machining solution in the machining tank 5, and electric discharge is generated by the machining solution between the electrode and the workpiece 1 so that the workpiece can be machined.

Figure 2:
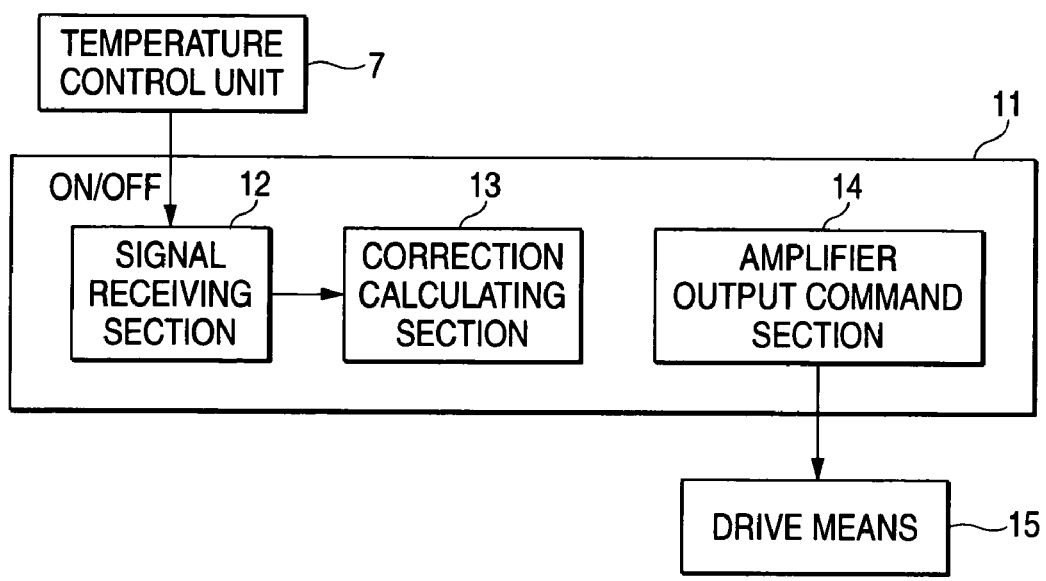
FIG. 2 is a block diagram showing the control of axial displacement correction conducted according to a change in the temperature of a machining solution in an electric discharge machine of an embodiment of the present invention.

FIG. 2 is a block diagram showing the control of axial displacement correction conducted according to a change in the temperature of a machining solution in an electric discharge machine of an embodiment of the present invention. In the block diagram, reference numeral 7 is a temperature control unit for controlling the temperature of the machining solution by operation of ON/OFF of electric power, reference numeral 11 is a control means, reference numeral 12 is a signal receiving section, reference numeral 13 is a correction calculating section, reference numeral 14 is an amplifier output command section, and reference numeral 15 is a drive means such as a linear motor. As described before, the control means 11 conducts the relatively positioning control of positioning the electrode and the workpiece and also conducts the control of the electric power source 8. However, only a portion, in which correction control of correcting the axial displacement caused by a change in the temperature of the machining solution is conducted, is shown in FIG. 2.

A signal of ON/OFF of electric power of the temperature control unit 7 is sent to the signal receiving section 12 arranged in the control means 11. According to ON/OFF of the receiving signal of the signal receiving section 12, the correction calculating section 13 calculates an amount of correction. This amount of correction is sent to the amplifier output command section 14. Then, the amplifier output command section 14 gives a command to the drive means 15 so that an axial feed of the amount of correction can be conducted.

FIGS. 3A to 3C are graphs showing a result of the measurement of the axial displacement caused by operation of ON/OFF of electric power of the temperature control unit 7 when the electric discharge machine is operated. FIG. 3A represents a signal of ON/OFF of electric power of the temperature control unit 7, FIG. 3B represents a temperature of the machining solution, and FIG. 3C represents an axial displacement of Z axis. An axial displacement of Z axis is measured in such a manner that a reference pin in which a ball is attached to the end of the rod, is arranged so as to be opposite to both of the electrode side and the center of the surface plate, and the both end portions are made to come into contact with the electrode and the center of the surface plate, respectively periodically so that the relative position can be measured. From FIGS. 3A to 3C, it can be understood that according to a change in the signal of ON/OFF of electric power of the temperature control unit 7, the temperature of the machining solution is changed, and an axial displacement of Z axis is caused corresponding to this change in the temperature of the machining solution. It can be also understood that the temperature wave-form (b) of the machining solution and the axial displacement wave-form (c) of Z axis have the substantially same tendency.

Figure 4A:
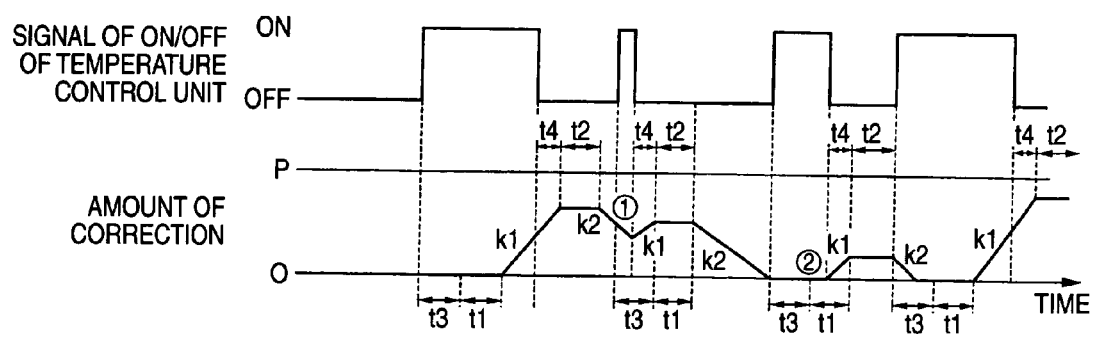
FIGS. 4A and 4B are time charts showing an example of operation of the control of axial displacement correction conducted according to a change in the temperature of the machining solution in the electric discharge machine of an embodiment of the present invention.
Figure 4B:
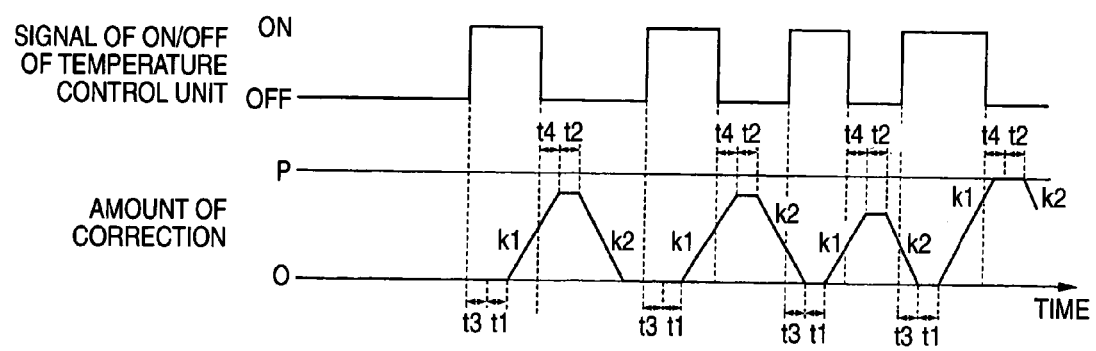

FIGS. 4A and 4B are time charts showing an example of operation of the control of axial displacement correction conducted according to a change in the temperature of the machining solution in the electric discharge machine of an embodiment of the present invention. FIGS. 4A and 4B show a calculating motion of calculating an amount of correction conducted by the correction calculating section 13 in the control means. 11 shown in FIG. 2. In FIGS. 4A and 4B, t1 and t2 represent a waiting time, t3 and t4 represent a correction continuation time, k1 represents an inclination of the amount of correction in the case where the amount of correction is increasing, and k2 represents an inclination of the amount of correction in the case where the amount of correction is decreasing. P is an amount of the maximum correction, which is appropriately set so as to restrict too much correction.

The amount of correction is approximate to a continuation of straight lines. The amount of correction is given in the direction opposite to the axial displacement so that the axial displacement for example, the axial displacement of Z axis shown in FIG. 3C caused by a change in the temperature of the machining solution can be corrected. For example, the amount of correction is set as shown in the following items (1) to (3).

(1) A case in which the signal of the temperature control unit 7 is changed from OFF to ON is described as follows.

The correction immediately before the change in the signal is continuously conducted in the period of time from when the signal of the temperature control unit 7 is changed over from OFF to ON to when the correction continuation time t3 passes. After the correction continuation time t3 has passed and further after the waiting time t1 has passed, correction is started, and an amount of the correction is increased by an inclination k1. When the amount of correction has reached the maximum amount of correction P, the maximum amount of correction P is maintained.

(2) A case in which the signal of the temperature control unit 7 is changed from ON to OFF is described as follows.

The correction immediately before the change in the signal is continuously conducted in the period of time from when the signal of the temperature control unit 7 is changed over from ON to OFF to when the correction continuation time t4 passes. After the correction continuation time t4 has passed and further after the waiting time t2 has passed, correction is started, and an amount of the correction is decreased by an inclination k2. When the amount of correction has reached 0, the amount of correction is maintained at 0.

(3) A case in which the time of correction is out of order is described as follows.

After the signal of the temperature control unit 7 has been changed from OFF to ON, the signal of the temperature control unit 7 is changed from ON to OFF in the correction continuation time t3. In this case, the correction continuation time t4 is started and the amount of correction is increased by the inclination k1 (Refer to (1) in FIG. 4A). In the same manner as that of the case in which the signal of the temperature control unit 7 is changed in the correction continuation time, in the case in which the signal of the temperature control unit 7 is changed in the waiting time t1 after the correction continuation time t3 has passed, the amount of correction is increased by the inclination k1 in the correction continuation time t4 after this change in the signal (Refer to (2) in FIG. 4A.).

In the waiting time t1 and t2 in the above explanation, the values at the start of t1 and t2 are continued. In the correction continuation time t3, the inclination k2 of the amount of correction at the start of t3 is continued. When the amount of correction is 0, the value 0 is continued. In the case where the amount of correction is 0 at the start of t3, the value 0 is continued. In the correction continuation time t4, the inclination k1 of the amount of correction at the start of t4 is continued. When the amount of correction becomes the maximum amount of correction P, the value P is continued. When the amount of correction is the maximum amount of correction P at the start of t4, the value P is continued.

As shown in FIGS. 3A to 3C, the axial displacement is generated corresponding to a change in the temperature of the machining solution. This change in the temperature of the machining solution corresponds to a signal of ON/OFF of electric power of the temperature control unit 7. Accordingly, the axial displacement is generated corresponding to the signal of ON/OFF of electric power of the temperature control unit 7. When an experiment is made in which the time of the signal of ON/OFF of electric power of the temperature control unit 7 and the axial displacement are measured, this axial displacement is approximated to a continuation of straight lines. In this way, it is possible to determine the waiting time t1, t2, the correction continuation time t3, 4 and the inclination k1, k2 of the amount of correction shown in FIGS. 4A and 4B which are parameters used for the calculation of the amount of correction of the correction calculating section 13 of the control means 11 shown in FIG. 2.

Figure 5:
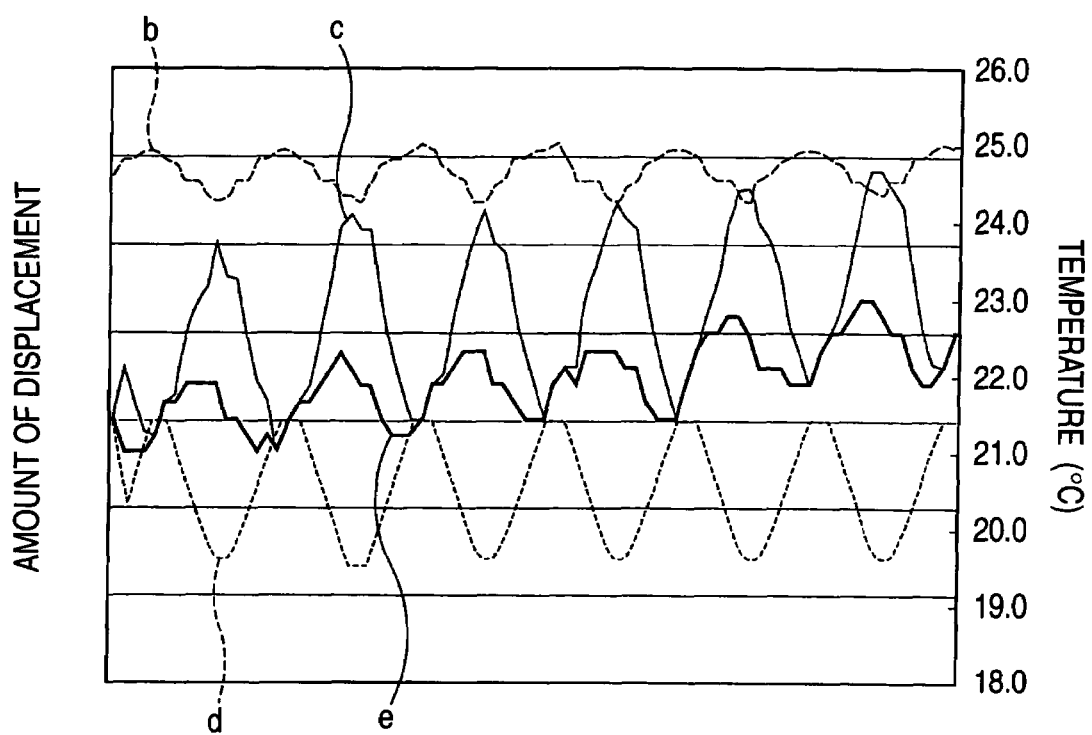
FIG. 5 is a graph showing an example of the result of the measurement of the axial displacement of the electric discharge machine of an embodiment of the present invention.

FIG. 5 is a graph showing an example of the result of the measurement of the axial displacement of the electric discharge machine of an embodiment of the present invention. The curve b represents a temperature of the machining solution, the curve c represents an axial displacement of Z axis in the case where the correction of the present invention is not conducted, the curve d represents an amount of correction, and the curve e represents an axial displacement of Z axis in the case where the correction of the present invention is conducted.

The wave-form of the amount of correction (curve d) is the substantially same in the opposite direction as that of the axial displacement (curve c) of Z axis in the case where correction is not conducted. Accordingly, the axial displacement (curve e) of Z axis in the case where correction of the present invention is conducted is greatly reduced compared with the axial displacement (curve c) of Z axis in the case where correction of the present invention is not conducted.

As explained above, in the embodiment of the present invention, the amount of correction conducted in the direction, in which the thermal displacement of the machine body can be canceled, is calculated corresponding to the signal of ON/OFF of electric power of the temperature control unit 7, and the control means 11 is provided by which an operation command of axial feed of this amount of correction is sent to the drive means 15. Therefore, correction of the thermal displacement of the machine body generated by a change in the temperature of the machining solution can be easily and effectively conducted without using a specific device.

Industrial Applicability

As explained above, the electric discharge machine of the present invention is suitably used for an highly accurate electric discharge work.

What is claimed is:

1. An electric discharge machine having a temperature control unit for controlling a temperature of a machining solution in a machining tank by turning on and off electric power, machining electric power being supplied between an electrode and a workpiece while the electrode and the workpiece are being relatively moved in the machining solution by a drive unit, the workpiece being machined by electric discharge energy, the electric discharge machine characterized by comprising: a controller for operating the drive unit in a direction in which a thermal displacement of the electric discharge machine body is canceled, corresponding to the inputting of a signal of ON/OFF of electric power of the temperature control unit.

2. An electric discharge machine having a temperature control unit for controlling a temperature of a machining solution in a machining tank by turning on and off electric power, machining electric power being supplied between an electrode and a workpiece while the electrode and the workpiece are being relatively moved in the machining solution by a drive unit, the workpiece being machined by electric discharge energy, the electric discharge machine characterized by comprising: a controller for calculating an amount of correction in a direction in which a thermal displacement of the electric discharge machine body can be canceled corresponding to a signal of ON/OFF of electric power of the temperature control unit, wherein an operation command of feeding an axis corresponding to the amount of correction is sent to the drive unit.

3. An electric discharge machine according to claim 2, wherein after a signal of ON/OFF of electric power has been changed over and detected, correction before the changeover of the signal of ON/OFF of electric power is maintained in a predetermined correction continuation time.

4. An electric discharge machine according to claim 2, wherein an amount of correction in a direction in which a thermal displacement of a machine body is canceled is restricted so that correction can not be imposed too much.

* * * * *